United States Patent [19]

Masaki

[11] Patent Number: 4,630,996
[45] Date of Patent: Dec. 23, 1986

[54] WINDMILL

[75] Inventor: Kazumi Masaki, Osaka, Japan

[73] Assignee: Ken Hayashibara, Okayama, Japan

[21] Appl. No.: 649,067

[22] Filed: Sep. 10, 1984

[30] Foreign Application Priority Data

Sep. 22, 1983 [JP] Japan ................. 58-174191

[51] Int. Cl.⁴ .......................... F03D 7/06; F03D 11/04
[52] U.S. Cl. ......................................... 416/16; 416/41; 416/135; 416/142
[58] Field of Search ................. 416/16, 139 A, 142 B, 416/41 A, 41 R, 102, 148, 197 A, DIG. 6, 135 R, 136, 137

[56] References Cited

U.S. PATENT DOCUMENTS

| | | | |
|---|---|---|---|
| 1,697,574 | 1/1929 | Savonius | 416/DIG. 6 |
| 3,093,194 | 6/1963 | Rusconi | 416/DIG. 6 |
| 4,142,830 | 3/1979 | Schonball | 416/142 B |
| 4,219,309 | 8/1980 | Ross | 416/80 |
| 4,362,466 | 12/1982 | Schonball | 416/142 B |
| 4,415,813 | 11/1983 | Carme | 290/55 |
| 4,449,889 | 5/1984 | Belden | 416/16 |

FOREIGN PATENT DOCUMENTS

| | | | |
|---|---|---|---|
| 158861 | 7/1952 | Australia | 416/135 A |
| EP33258 | 8/1981 | European Pat. Off. | 416/142 B |
| 2713810 | 10/1978 | Fed. Rep. of Germany | 416/197 A |
| 2720741 | 11/1978 | Fed. Rep. of Germany | 416/197 A |
| 2929668 | 1/1981 | Fed. Rep. of Germany | 416/16 |
| 726828 | 6/1932 | France | 416/135 |
| 2295259 | 7/1976 | France | 416/142 B |
| 2468000 | 5/1981 | France | 416/142 B |
| 81/01443 | 5/1981 | World Intel. Prop. Org. | 416/142 B |
| 1518151 | 7/1978 | United Kingdom | 416/DIG. 6 |
| 2049831 | 12/1980 | United Kingdom | 416/142 B |
| 2097481 | 11/1982 | United Kingdom | 416/DIG. 9 |

Primary Examiner—Everette A. Powell, Jr.
Attorney, Agent, or Firm—Browdy and Neimark

[57] ABSTRACT

Disclosed is a windmill whose impeller and strut are protected from harms by high wind, comprising an impeller; a strut; weight; and means for supporting said strut in such a manner that said strut is capable of rotating and inclining around pivot, wherein said impeller and weight are installed at different sides of said strut, and wherein said strut is supported by said means at the pivot located between said impeller and the center of gravity.

1 Claim, 4 Drawing Figures

WINDMILL

FIELD OF THE INVENTION

The present invention relates to a windmill, more particularly, it relates to a windmill whose impeller and supporting member tolerate high wind and are not prone to the damage or destruction thereby.

BACKGROUND OF THE INVENTION

Recently, conversion of natural energies such as solar energy, terrestrial heat, wind power and tidal energy, or biological energies such as that of biomass is extensively studied because of the rising cost of petroleum energy. Especially, conversion of the wind energy into electricity or rotation energy have been widely used since the equipment for such conversion is relatively low-cost and highly durable.

Wind, however, extensively varies in velocity and easily shifts its direction dependent upon season, location and time of the day. As in the case of typhoon or gust, there is a fear for a sudden incidence of a powerful wind which is extremely higher in energy than those usually observed.

Accordingly, besides difficulties to obtain a energy at constant level with such variable wind, it is important that windmill should be protected from damage or destruction by typhoon or gust.

As to the means to protect windmill from harms by high wind, various attempts have been proposed: For example, Japan Patent Kokai No. 143,369/81 discloses an attempt to prevent the destruction of propeller-type windmill by high wind placed on the top of a tower by descending the windmill and turning up its nacelle. Japan Patent Kokai No. 41,467/81 discloses an attempt to prevent the destruction of propeller-type windmill by changing the pitch of its fliers.

The former attempt, however, requires a mechanical descending operation and night watchman, as well as having a disadvantage that the tower per se may not tolerate high wind.

In the latter attempt, although the fliers of the windmill may tolerate a relatively low wind, it is doubtful whether the whole windmill structure and strut tolerate a higher wind.

BRIEF DESCRIPTION OF THE DRAWINGS

The drawing figures show the embodiments according to the invention.

FIG. 2 is a side elevation view when the strut is perpendicular;

and FIG. 3 is a side elevation view when the strut is inclined.

Figure 1:
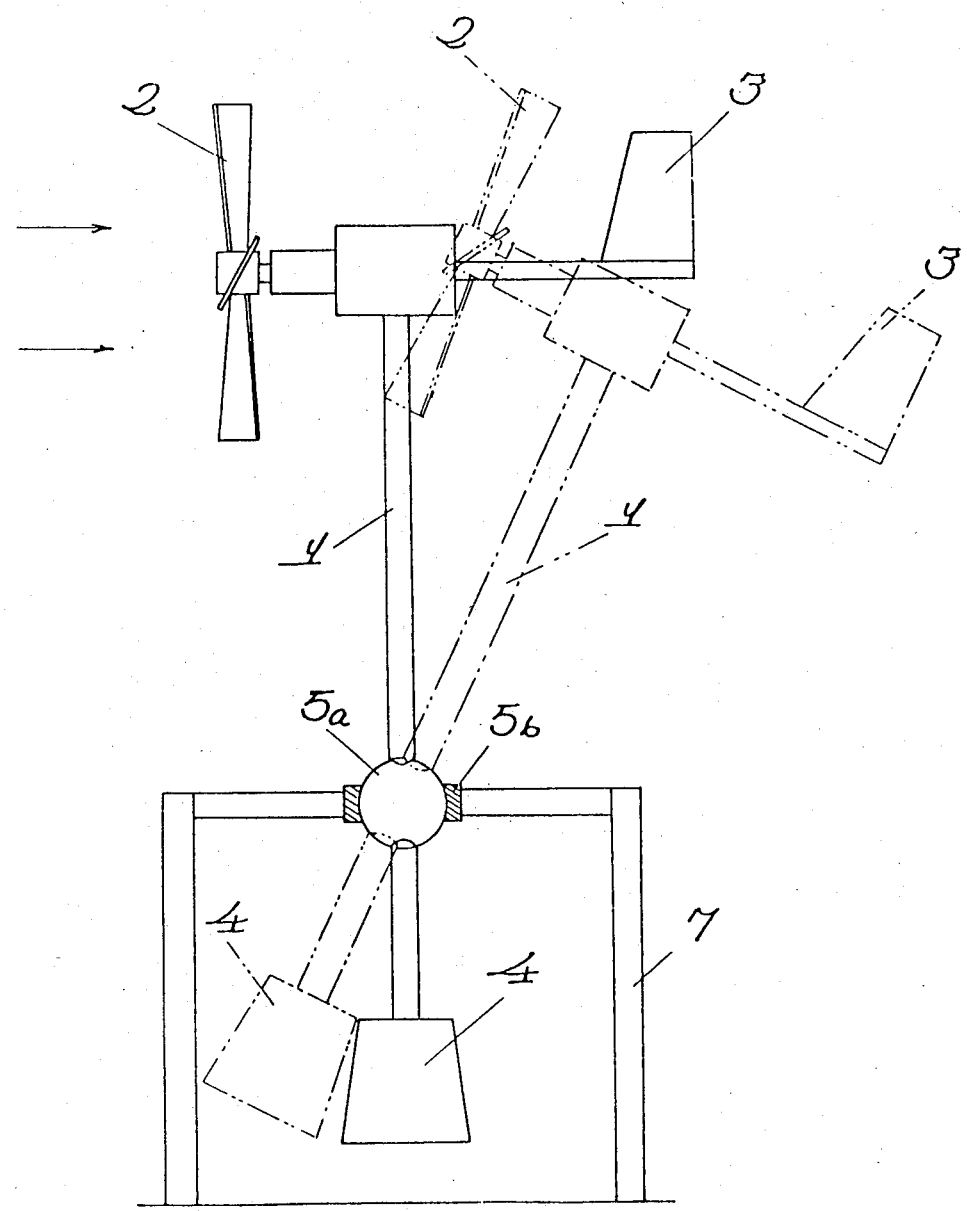
FIG. 1 is a partial cutway side elevation view of an embodiment using a propeller-type impeller.

Throughout the figures, (1) is strut; (2), impeller; (3), rudder; (4), weight; (5), supporting member capable of rotating and inclining; (6), spring; and (7), crate.

DETAILED DESCRIPTION OF THE INVENTION

Upon diligent studies on various means to effectively and automatically protect whole windmill structure including strut from destruction by high wind, the present inventor has accomplished a novel windmill. This is the present invention.

More particularly, the present invention provides a windmill wherein an impeller and a weight are installed at different sides of a strut which is supported at a pivot located between the impeller and the center of gravity with a supporting member capable of rotating and inclining in such a manner that the strut is usually maintained perpendicularly, but freely inclines as the wind gains in velocity, whereby the impeller and strut are protected from destruction by wind.

Referring now to the drawing figures, there is shown an embodiment according to the invention wherein impeller (2) is installed at one side of strut (1).

Figure 2:
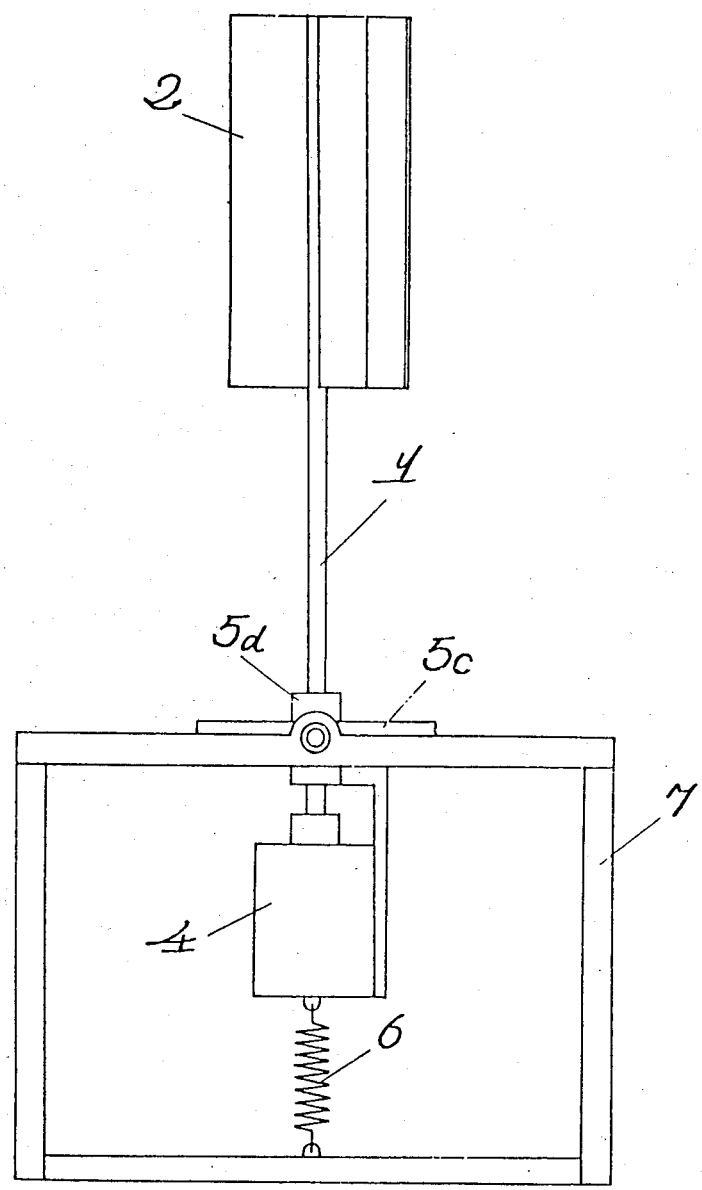
FIGS. 2 and 3 show embodiments using a vertical-type impeller.
Figure 3:
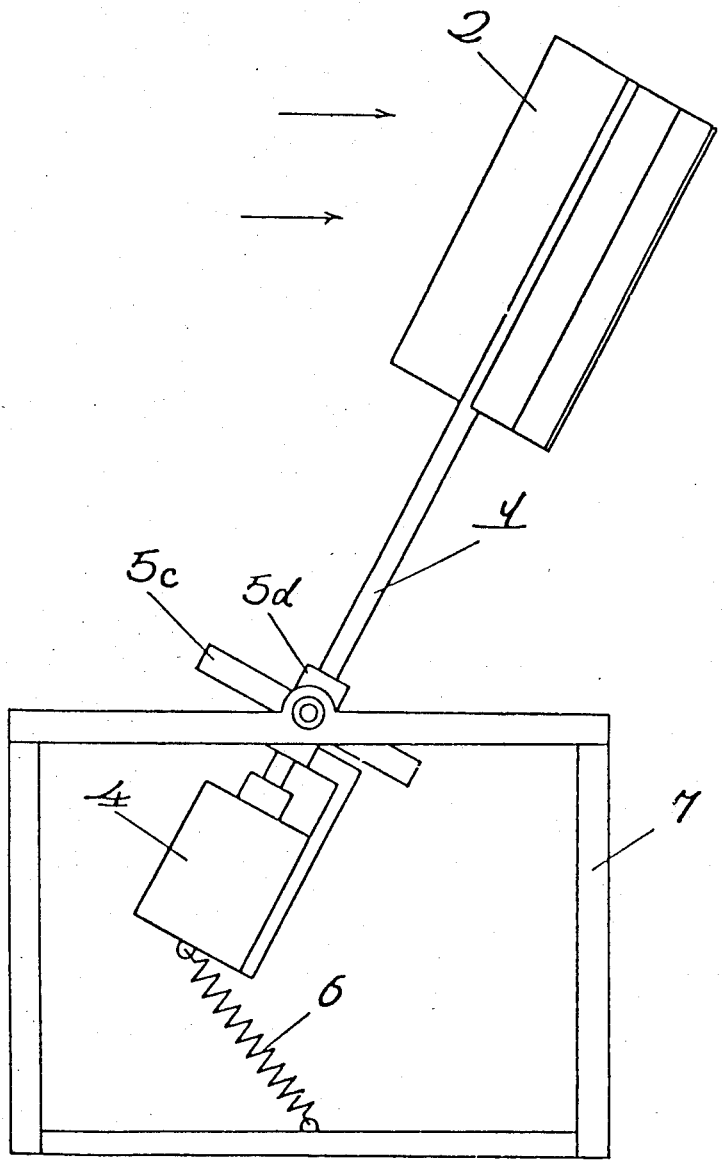
Figure 4:
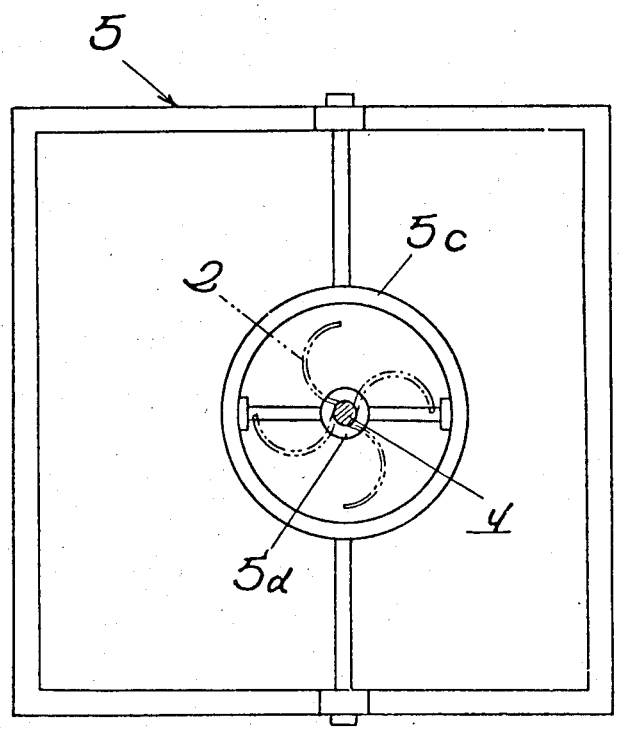
FIG. 4 is a plane view showing one side of the supporting member capable of rotating and inclining.

Impeller (2) usable in the invention is of propeller-type as shown in FIG. 1, or of vertical-type as shown in FIG. 2. The use of the former propeller-type impeller inevitably requires rudder (3), as well as installation of a shaft in strut (1) to change the axis of rotation to an appropriate direction to utilize the rotation of the impeller. The vertical-type impeller can be rotated with a wind from any direction, and requires neither rudder nor equipment to change the axis of rotation. This type of impeller has an additional advantage that strut (1) per se may be used as rotation shaft of impeller (2).

Weight (4) is installed at the lower part of strut (1).

Supporting member (5) supports the strut (1) in such a manner that strut (1) can rotate and incline around the pivot. As to such supporting member, suitable known means are feasible: For example, strut (1) may be supported with a bearing (5b) having a spherical inner structure (5a), or with a gyrocompass-type bearing (5d) having a pedestal capable of rotating and inclining.

Strut (1) is supported perpendicularly with supporting member (5) at a point (pivot) located between impeller (2) and the center of gravity in such a manner that the impeller-bearing side of strut (1) is kept vertical by weight (4) when impeller (2) receives a wind with a velocity in normal range, and that strut (1) inclines when impeller (2) receives a wind having a velocity over a critical level. The location of the pivot can be determined by the weight of impeller (2), length of strut (1), weight (4), and the critical wind velocity. Weight (4) may be assisted with spring (6).

In the windmill having the structure according to the present invention, a wind having a velocity lower than the critical level rotates impeller (2). When a velocity exceeds the critical level, strut (1) automatically inclines towards the direction of the wind against either weight (4) or spring (6) to decrease the wind pressure on impeller (2) and its rotation. Thus, strut (1) and impeller (2) can be protected from damage or destruction by wind. As the wind velocity declines, weight (4) or spring (6) automatically restore strut (1) and impeller (2) into normal position and rotation.

In this manner, the present windmill is safe from destruction by high wind to continue conversion of wind power into rotation energy.

Accordingly, the present windmill is freely usable on land and sea because it can be safely operated even when high wind blows. For example, the present windmill can be favorably used as fan-driven generator by replacing weight (4) with a dynamo driven by the rotation of impeller (2). In addition, the present windmill can be widely used to effect forced convection in an air-conditioned house and a solar energy- or terrestrial heat greenhouse.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

I claim:
1. In a vertical-type windmill consisting essentially of
   a tower structure;
   a pivot;
   a strut rotatably supported on the upper portion of the tower structure by the pivot so that the strut is capable of inclining around the pivot when the velocity of the wind exceeds a prescribed level;
   a vertically disposed impeller including a plurality of fliers, said impeller being carried on said strut;
   and a dynamo installed on the lower portion of the strut and engaged with the lower part of the tower structure with a spring, said dynamo functioning as a counterweight,
   the improvement comprising:
   said pivot constituting a gyrocompass-type bearing having a pedestal supported on the upper portion of the tower structure, the strut being rotatably supported on the pedestal,
   whereby the strut is capable of instantly inclining in the direction of the wind when the velocity of the wind exceeds a prescribed level.

* * * * *